United States Patent [19]

Cordan, Jr.

[11] Patent Number: 4,803,707

[45] Date of Patent: Feb. 7, 1989

[54] NONVOLATILE ELECTRONIC ODOMETER WITH EXCESS WRITE CYCLE PROTECTION

[75] Inventor: Ernest W. Cordan, Jr., Colorado Springs, Colo.

[73] Assignee: NCR Corporation, Dayton, Ohio

[21] Appl. No.: 135,200

[22] Filed: Dec. 21, 1987

[51] Int. Cl.$^4$ .......................................... G01C 22/00
[52] U.S. Cl. .................................. 377/24.1; 364/561; 377/26
[58] Field of Search .................. 377/24.1, 26; 364/561

[56] References Cited

U.S. PATENT DOCUMENTS

| | | | |
|---|---|---|---|
| 4,528,683 | 7/1985 | Henry | 377/24.1 |
| 4,663,770 | 5/1987 | Murray et al. | 377/24.1 |
| 4,682,287 | 7/1987 | Mizund et al. | 364/561 |
| 4,710,888 | 12/1987 | Burke et al. | 377/24.1 |
| 4,757,522 | 7/1988 | Kieselstein | 377/26 |
| 4,768,210 | 8/1988 | Pockrandt | 377/24.1 |

Primary Examiner—John S. Heyman
Attorney, Agent, or Firm—Wilbert Hawk, Jr.; Casimer K. Salys

[57] ABSTRACT

A vehicle odometer system for counting pulses representing translation and storing in nonvolatile form binary data representing the decimal values of the odometer data. The architecture of the circuit is structured to use the data in the more significant digit positions of the odometer count as pointers for the nonvolatile storage addresses used to store data for the less significant digit positions. This arrangement ensures that the endurance capabilities of the nonvolatile memory array are taken into account while apportioning degradation in relation to the significance of the odometer data to be stored. Furthermore, electronic manipulation of the odometer data is prevented by inclusion of a write only high odometer value flag which cannot be removed and is redundantly detected.

7 Claims, 7 Drawing Sheets

FIG. 2

16 X 4 EEPROM MEMORY MAP

| Decimal Address | Binary Address | Store | Range |
|---|---|---|---|
| 15 | 1111 | $10^5$ STORE | (OVERFLOW FLAG) |
| 14 | 1110 | $10^4$ STORE | ($10^0$ ADDRESS POINTER) |
| 13 | 1101 | $10^3$ STORE | |
| 12 | 1100 | $10^2$ STORE | > 100K mi |
| 11 | 1011 | $10^1$ STORE | 0 - 100K mi |
| 10 | 1010 | | > 90K - 100K mi |
| 9 | 1001 | $10^0$ STORE | > 20K - 30K mi |
| ... | ... | | > 10K - 20K mi |
| 1 | 0001 | | 0 - 10K mi |
| 0 | 0000 | | |

← 4 BITS →

INITIALIZATION SEQUENCE

NV STORE SEQUENCE

NONVOLATILE ELECTRONIC ODOMETER WITH EXCESS WRITE CYCLE PROTECTION

BACKGROUND OF THE INVENTION

The present invention relates to an electronic circuit for accumulating signals representing the translation of vehicle or the like, including provisions for storing the signal counts in nonvolatile memory during periods when the vehicle power is disabled. More particularly, the invention provides a structured arrangement for initializing, accumulating and storing in nonvolatile form digital representations of translation information using conventional EEPROM architecture with memory mapped shifting of addresses to allocate endurance degradation effects in relative relation to the significance of the data being stored.

The endurance limitations of nonvolatile memory arrays are well known to designers of electronic circuits. Whether the degradation is characterized by a reduction of the data window or an extension of the erase/write time periods, designers of circuits including nonvolatile devices routinely configure the circuits to specifically control the number of erase/write cycles experienced by each identified nonvolatile device. On the other hand, nonvolatile devices are conventionally designed to allow a substantially unlimited number of read cycles without affecting the data content being addressed.

Designers of digital electronic devices for automotive applications clearly recognize that vehicle translation measurement devices, odometers, must be capable of storing the data in nonvolatile form, in the event the vehicle power is briefly interrupted, e.g. during a battery change, or extendedly absent. Furthermore, odometer accuracy requirements mandate that the stored information must be updated with sufficient frequency to correctly represent the actual distance travel by the vehicle.

The fundamental problems have been the subject of investigation by various circuit designers. Unfortunately, the solutions tend to be extremely complex, both in the architecture of the circuit implementation, which defines the functional blocks and their interconnection, as well as the elaborate and interrelated operations performed by the functional blocks. Furthermore, the known designs are highly particularized to a prescribed arrangement of odometer characters, thereby requiring major revisions of the architecture for superficially minor changes in the number of odometer digits or endurance characteristics of the nonvolatile device.

For example, U.S. Pat. No. 4,528,683 implements an odometer using a highly particularized five-bit word per decimal position counting scheme with a multi-level multiplexer to provide an elaborate permutation of nonvolatile memory addresses for distributing endurance degradation among cells. Movement of the decimal ones, tens, hundreds and thousands, position through the memory array is used to spread the erase cycle "wear" effects throughout the memory array. Thereby, the numerous erase/write cycles associated with the decimal ones digit are shared by the memory array cells. Typical nonvolatile memories cells begin to exhibit endurance degradation after approximately 10,000 erase/write cycles.

The approach taken in U.S. Pat. No. 4,663,770 is somewhat different, in that the counters themselves are the nonvolatile storage devices. Counter usage from the least to the most significant bit positions is successively shifted to distribute the erase/write cycle degradation effects among the various counter stages. Though the architecture distributes the erase/write "wear" among nonvolatile devices within the system, the coding and decoding of such distributed use is complex both in conceptual implementation and hardware configuration. Refinements are obviously difficult to implement.

Accordingly, there exist a need for a design of conventional architecture which is readily amenable to refinements and improvements at incremental levels, can be implemented with relatively conventional electronic devices, and allocates endurance degradation in relative relation to the significance of the decimal count position.

SUMMARY OF THE INVENTION

The present invention implements a digital odometer type translation measuring circuit using a multiple stage binary coded decimal (BCD) counter operable in conjunction with a four bit wide EEPROM array and a PLA sequence controller, by selectively indexing the nonvolatile memory array addresses in direct relation to the count status in more significant digit positions. A transfer of the binary count information to the nonvolatile memory is initiated, for example, with each indexing of the ones digit decimal number, the sequence of the transfer being controlled by the PLA so that only the decimal positions subject to indexing are written into the nonvolatile memory array.

The nonvolatile memory array address used to write the binary word representing the decimal ones digit is indexed with each change in the ten thousands digit count. This arrangement ensures that the "write" cycles for the nonvolatile cells storing the ones digit count are limit 10,000 occurrences for an odometer reading of 100,000 miles or less. The selection of the 10,000 is based upon conservative EEPROM specifications, which typically recognize the onset of degradation with multiples of 10,000 cycles. Allocation of addresses within the memory array ensures that more significant decimal digits are stored in nonvolatile cells which are subject to less endurance degradation.

These and other particularizing aspects of the invention will be more fully appreciated from the development of the preferred embodiment as set forth hereinafter.

BRIEF DESCRIPTION OF THE DRAWINGS

FIG. 2 schematically illustrates by memory map the allocation of the nonvolatile memory to implement the architecture in FIGS. 1A and 1B.

DESCRIPTION OF THE PREFERRED EMBODIMENT

The ensuing embodiment of a nonvolatile electronic odometer with excess write cycle protection according to the present invention is described in the context of an automative application where translations are accumulated in 0.1 mile increments, are stored in nonvolatile form at 1.0 mile increments, and are displayed in decimal form to a maximum count of 99,999 miles. The nonvolatile device used to store odometer information in full mile increments is a conventionally organized EEPROM array having substantially flat data retention characteristics through an endurance of 10,000 write cycles and a conservative operability range well beyond 20,000 cycles. The memory array is arranged to store four bit wide words, each representing a decimal position of the odometer count, in a 16×4 size array. As embodied, the EEPROM is a contemporary "direct write" design, to dispense with the need for erase operations irrespective of whether a zero or one binary state was previously or is next to be written.

Figure 1A:
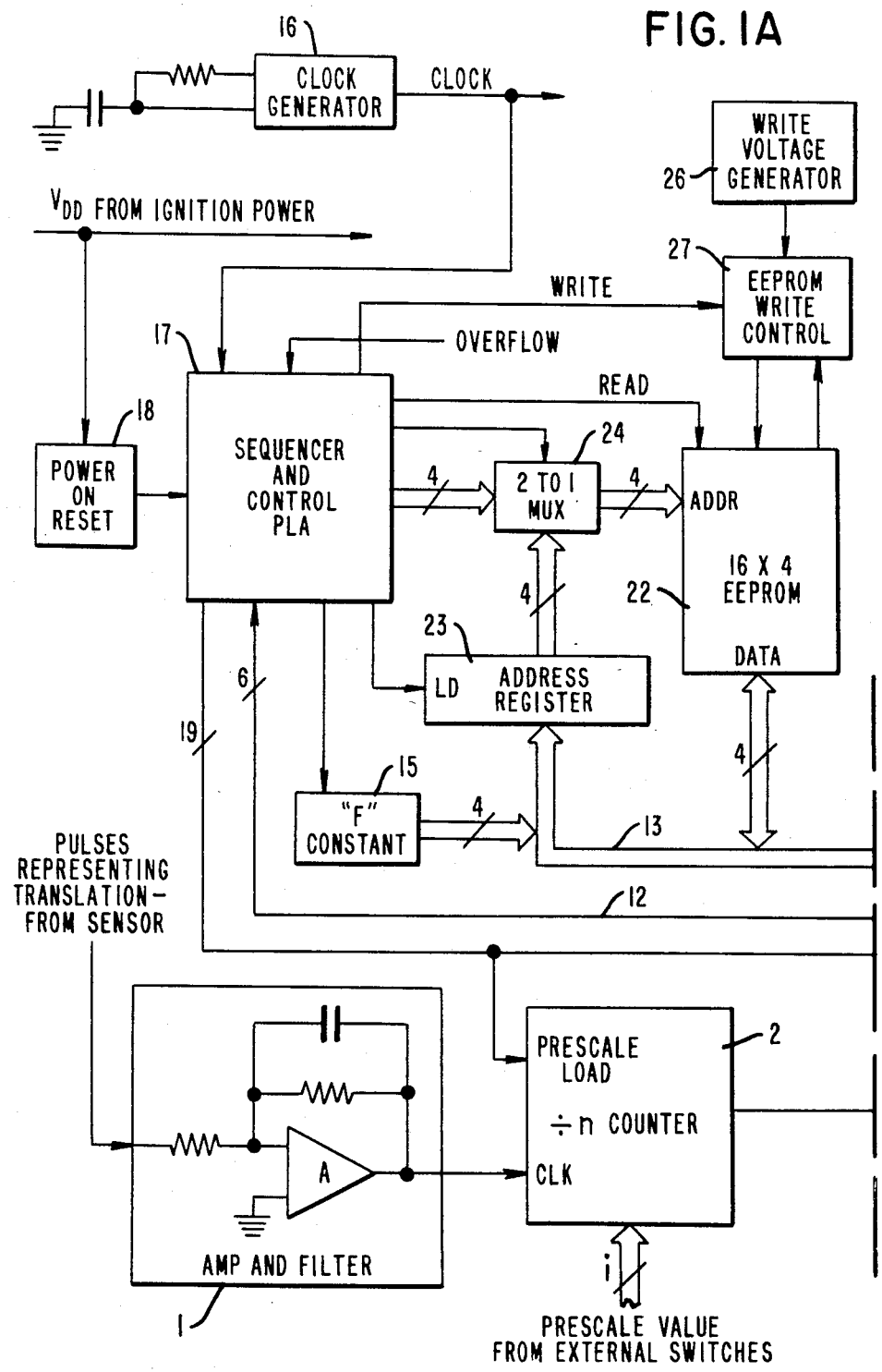
FIGS. 1A and 1B together schematically illustrate the architecture of a digital odometer according to the present invention.
Figure 1B:
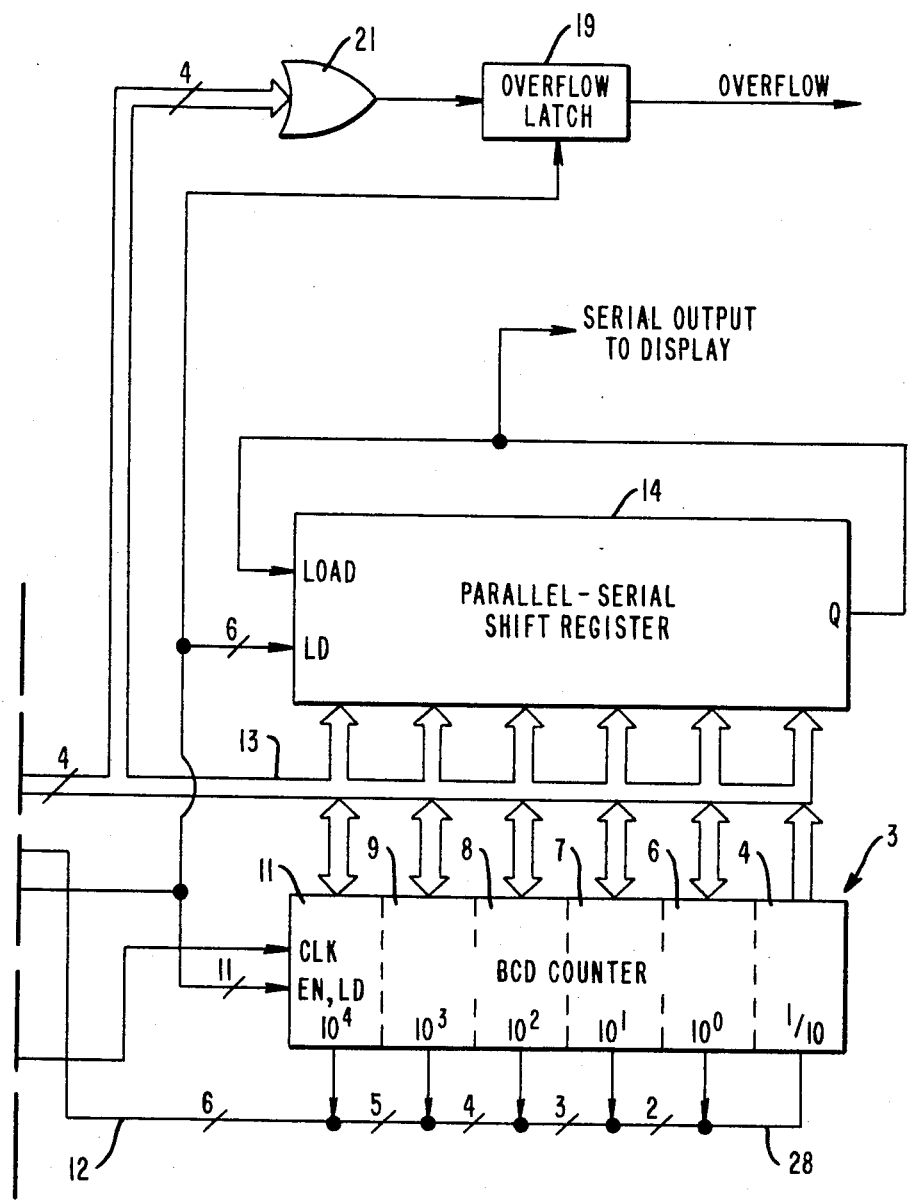

Attention is now directed to FIG. 1 of the drawings for a block diagram representation of the odometer system architecture. Pulses representing vehicle translation, for example, from a wheel movement sensor, are amplified and filtered in block 1 to provide square-shaped clocking pulses to divide-by-n counter 2. Divide-by-n counter 2 divides the frequency of the pulses by a factor n, defined by binary bits latched during initialization from a set of external switches. This prescale allows the electronic odometer to be adjusted for differences in the automobile structure, such as wheel size, differential ratio or metric odometer conversion, as may be appropriate. The prescaled odometer data digital pulses are transmitted as clocking signals into six stage BCD counter 3, in FIG. 1B. The prescale n is set to have each clocking pulse into BCD counter 3 represent 0.1 miles. BCD counter 3 is relatively conventional in that the existing count is always incremented from the least significant decimal stage 4 by one binary coded decimal at increments representing 0.1 miles. Each stage 4, 6, 7, 8, 9 and 11 holds a four bit word representing in BCD the value for the corresponding position in the odometer count, and has a selectively enabled input/output to data bus 13. BCD carry-out pulses are provided by individual BCD stage on bus 12 upon the occurrence of the carry-out from one decimal position to the next. BCD counter 3 also receives eleven control signals, six lines for individually enabling an output connection each BCD stage to four line wide bus 13, and five lines for individually enabling input of odometer count data from bus 13 into the stages 6, 7, 8, 9 or 11.

Parallel-to-serial shift register 14 is similarly loaded from bus 13 in response to individual control signals on the six LD input lines. Shift register 14 is also configured to recirculate previously existing odometer data through the load input, in coincidence with the serial shifting of the odometer data to an external display.

If electrical power was never interrupted, BCD counter 3 and shift register 14 would suffice as a means to accumulate odometer data and periodically transmit such data to a display. Recognizing that continuous electrical power cannot be expected, the invention selectively combines concepts from counting architectures with those attributable to nonvolatile memory array configurations and devices to provide a circuit arrangement which extendedly and reliably stores odometer data of frequent update.

The clock signals from generator 16 in FIG. 1A are provided to sequencer and control PLA 17 as a means for time synchronizing the PLA operation. PLA 17 also receives a power on reset command from block 18 in response to the enablement of vehicle ignition power.

Another signal affecting sequencer and control PLA 17 is the overflow signal, generated as shown in FIG. 1B by overflow latch 19 in response to the satisfaction of a OR condition in logic gate 21.

The overflow signal from 19 represents, in the context of the present embodiment, that the vehicle has exceeded 100,000 miles. The overflow signal is generated by a carry-out of the highest BCD stage 11. Preferably, the overflow flag is written to a distinct nonvolatile memory array address using the binary word 1111, a hex "F", generated in block 15.

As embodied, the overflow information is retained with accentuated redundancy. The use of OR gate 21 detects an overflow condition even with the loss of three binary ones from the flag, since a single one will satisfy the OR condition and thereby designate an overflow. This feature further reduces the likelihood of electronic tampering, in that the overflow flag is both not removable and highly redundant in its storage and retrieval implementation.

The effects of the six carry-out lines 12 on PLA 17 will be described at a later point.

Odometer data bus 13, common to the aforementioned OR gate 21, BCD counter 3, and shift register 14 is also, as shown in FIG. 1A, common to the data connections of 16×4 EEPROM 22 and the input side of address register 23. Address register 23 is selectively enabled by PLA 17 to latch data on bus 13 from EEPROM 22. The address data stored in address register 23 is multiplexed by mux block 24 with address data generated directly in PLA 17. Mux 24 is also driven by PLA 17, to select between a predefined PLA address or an address previously generated as odometer data for storage in EEPROM 22. Write voltage generator 26 and EEPROM write control 27 conventionally serve to provide direct write EEPROM 22 with signals of appropriate levels and at appropriate times to store data on bus 13 into the address locations defined by the signals on the address lines from mux 24. Reading of data from EEPROM 22 is similarly convention and responsive to PLA signals.

The allocation of the memory cells within EEPROM array 22 is schematically illustrated in FIG. 2 by decimal and binary addresses, and informational remarks. Recall that the writing of data into the nonvolatile memory array is in discrete miles and is accomplished upon the lapse of each discrete mile. However, the nonvolatile write/store operation is performed only as to those addresses which have been subject to change with the incremented mile. With no further refinements, the decimal ones digit count would be subject to 100,000 write cycles in 100,000 miles.

In keeping with the reliability and accuracy demanded of odometers, for extended periods of time and under severe temperature environments, the embodied EEPROM cell write operations were limited to a nominal range of 10,000 cycles. As so configured, the four bits representing the decimal ones mileage are stored in the first ten addresses of the nonvolatile memory array. Indexing through such first ten addresses at 10,000 mile increments is accomplished directly, using the ten thousands digit data as a pointer. For example, in a decimal context, when the ten thousands digit data is zero, the ones digit count is stored in the zero address of the memory array. When the vehicle reaches 10,000 miles, the presence of a data one in the ten thousands digit address creates a pointer to index the ones digit count store to the next address in the memory array. This pointed incrementing of address is continued until the vehicle reaches 100,000 miles. The cycle is then repeated through the same group of addresses. The tens digit address is shifted only once, from the decimal 10 to the 11 address, after 100,000 miles, responsive to the generation and detection of the overflow flag. Obviously, the number of write cycles applied to the hundreds digit, thousands digit and ten thousands digit addresses do not necessitate a relocation of addresses within the reasonable realm of a passenger vehicle's life.

It should be apparent from the description of the memory map as depicted in FIG. 2 that the allocation and shifting of addresses is highly structured, and further readily implemented by using the ten thousands digit and overflow flag (effectively the hundred thousands digit) data as direct pointers to memory addresses. The arrangement also incorporates a number of other more subtle yet highly desirable features. For one, note that the overflow flag is written with a high degree of redundancy and once so written is never subject to an erase cycle. This ensures a clear identification of any vehicle which has exceeded 100,000 miles. As another aspect, note that the more significant decimal measures of mileage are proportionately less frequently written. Consequently, the most significant digits are least subject to endurance degradation. The matching of decimal place significance with endurance is true even after the vehicle passes 100,000 miles, whereupon the tens digit storage location is shifted to a new address with a full complement of endurance capability. After 100,000 miles, the ones digit data is stored is stored in cells accumulating up to 20,000 write cycles, still well within the EEPROM endurance capabilities. Thereby, according to this circuit architecture and arrangement of the memory map, a relatively small EEPROM of conventional 16×4 arrangement not only retains in nonvolatile form all odometer data, but does so within a context of data priority which matches the endurance characteristics of the nonvolatile cell devices.

The sequence of the control signals generated by PLA 17 in response to a clock input signal is defined by the grouped logic diagrams in FIGS. 3, 4, 5A and 5B. Although the prescribed operations and decisions defined in the figures are believed to be relatively self-explanatory, a synopsis of the operations will be presented to identify characterizing links with the architecture of the present invention.

Figure 3:
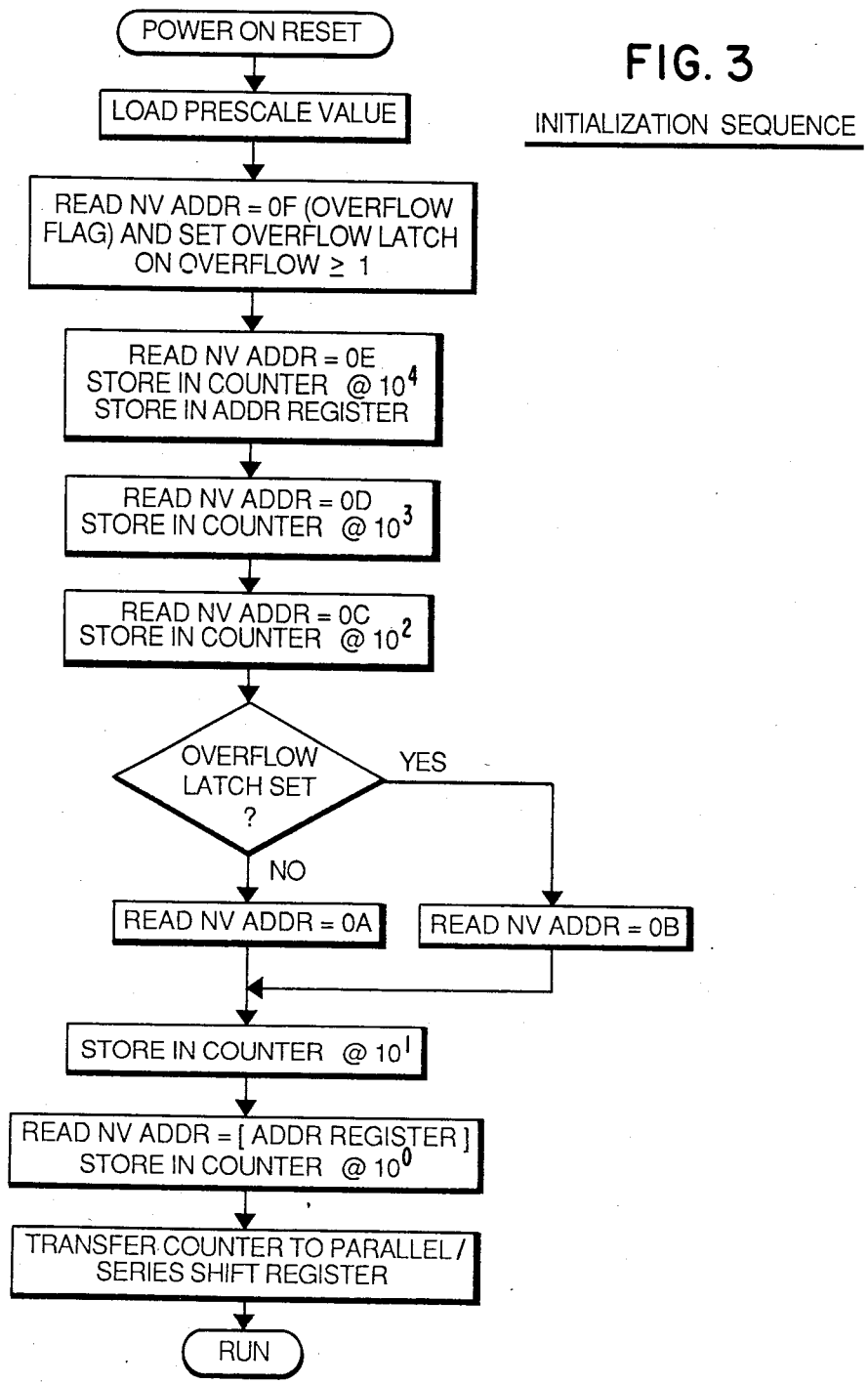
FIG. 3 is a logic flow diagram representing the initialization sequence.

The initialization sequence defined in FIG. 3 occurs each time the vehicle is restarted. Following a POWER ON RESET signal, the clock initiates as a first step a load of the prescale values into divide-by-n counter 2 (FIG. 1A). Thereafter, with successive clock cycles, the overflow flag value is read from EEPROM memory 22 and latched into overflow latch 19 (FIG. 1B), followed by a read of the ten thousands digit memory address and a store thereof in address register 23 (FIG. 1A), to serve as a pointer thereafter for the ones digit address, and a load thereof into BCD counter stage 11. Following such operations, the thousands digit odometer data is transferred from EEPROM memory 22 (FIG. 1A) to BCD counter stage 9 (FIG. 1B). A similar procedure is then implemented for the hundreds digit odometer data. The selection of the address for the tens digit odometer data is based upon whether the overflow latch has been set. Once selected, the tens digit data resident at such address is loaded into BCD counter stage 7. Thereafter, the ones digit data for the BCD counter is addressed, based upon the address pointer generated by the ten thousands digit count stored in address register 23 (FIG. 1A), and entered into BCD counter stage 6. Following such transfer of the ones digit data, display shift register 14 is updated with the BCD data and the standard run sequence is commenced.

Figure 4:
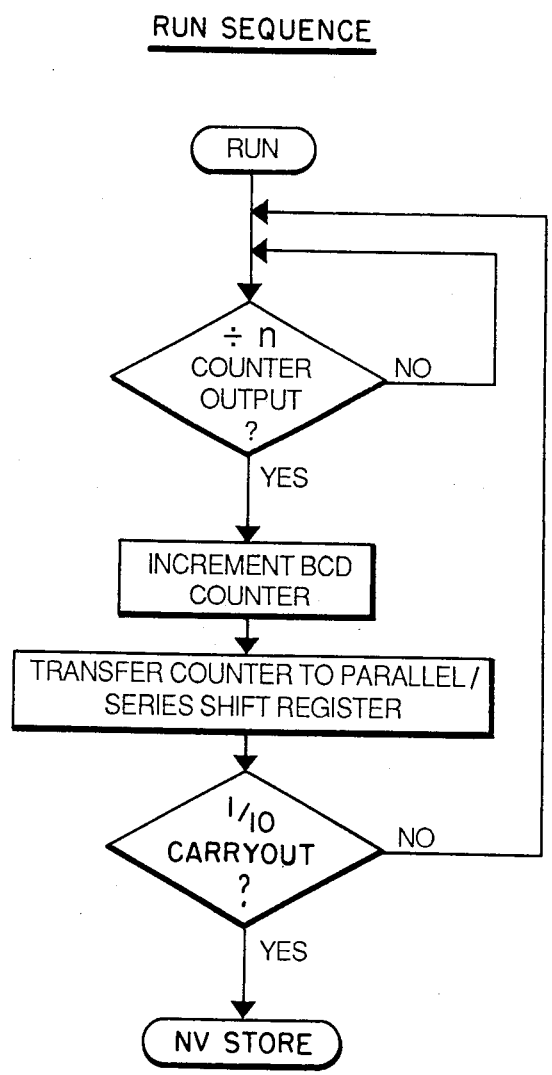
FIG. 4 is a logic flow diagram representing the run sequence.

The operations defined during the run sequence are depicted in FIG. 4. As shown, the BCD counter 3 is incremented by scaled count pulses from divide-by-n counter 2 with each such count, causing an update of the display by the transfer of the new information to the parallel-to-serial shift register 14. The procedure is repeated until a 0.1 mile carry-out signal is generated from BCD counter stage 4 on line 28 (FIG. 1B). Thereafter, a nonvolatile write/store sequence is commenced by signals from PLA 17 in accordance with the operations defined in FIGS. 5A and 5B.

The nonvolatile store sequence is commenced with each accumulation of a discrete mile in BCD counter 3. The initiation signal is the tenths digit carry-out on line 28. The store sequence begins with a transfer of the ten thousands digit odometer data into address register 23. An evaluation of the ten thousands digit carry-out is then performed to determine whether the 100,000 mile threshold was just exceeded. If so, the overflow latch is set and a hex "F" (binary 1111) is entered into the overflow address (decimal 15) of EEPROM 22. After the ten thousands digit has been evaluated, the thousands digit carry-out state is next evaluated. This sequence is repeated down to the ones digit level with the writing of the EEPROM array undertaken only when the carry-out represents that the next higher decimal position has been subject to an incremental increase. Upon entering the ones digit level carry-out evaluation, the absence of a carry-out causes the ones digit data to be written into EEPROM memory array 22 at the location pointed by the data in address register 23. On the other hand, if a ones digit carry-out has occurred the new tens digit count data is written into EEPROM 22 at one of two addresses depending on the state of the overflow latch. Recall that the overflow latch indicates whether the vehicle has exceeded 100,000 miles.

Figure 5A:
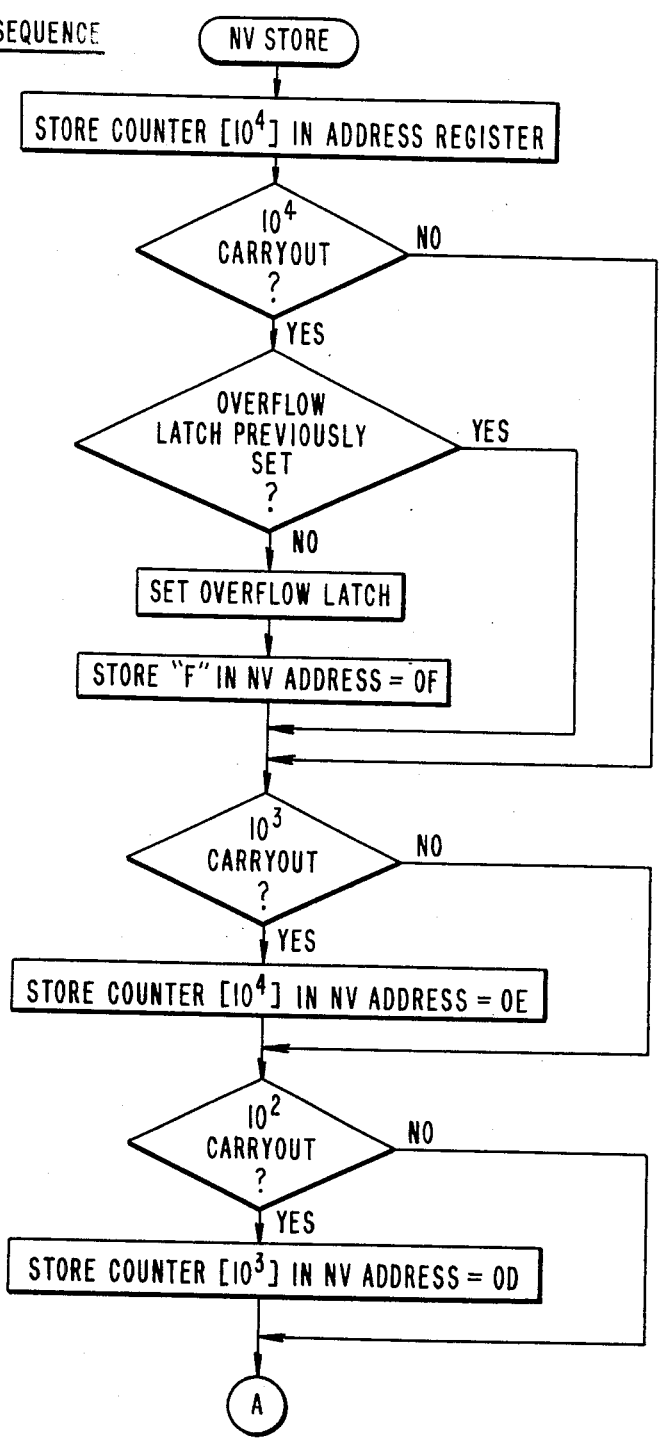
FIGS. 5A and 5B together form the logic flow diagram for the nonvolatile store sequence.
Figure 5B:
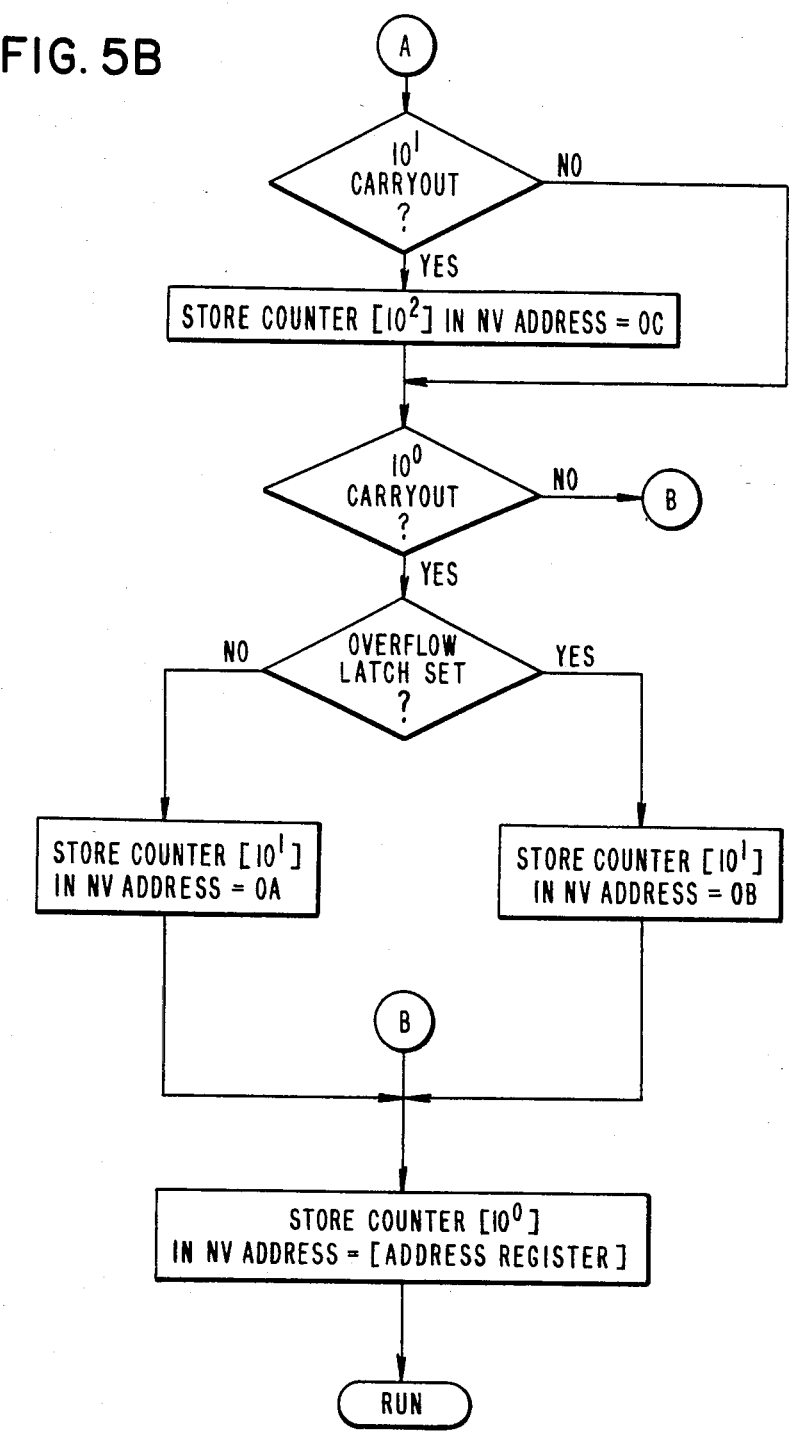

To avoid anamolous operations attributable to incomplete nonvolatile store sequences it is clearly desirable to incorporate conventional power-down features, most notably capacitive power storage capable of operating the circuit for at least the duration of the relatively brief nonvolatile store sequence depicted in FIGS. 5A and 5B.

In retrospect, note the highly structured arrangement of the memory array and PLA control sequence. The ordered nature lends itself to the introduction of refinements without major restructuring of the architecture. Note also that the allocation of the endurance degrading stresses is greatest to the least significant odometer data digits, in recognition of the corresponding importance attributed by the vehicle owner or subsequent purchaser.

In the event the exact digital count of the mileage beyond 100,000 miles is desired, the invention architecture is directly expandable by adding a stage to BCD counter 3 and storing its count data in the nonvolatile address previously allocated to the overflow. The overflow latch remains effective as before and the least significant bit of the hundred thousands digit data can be used if desired to point the nonvolatile storage address for the tens digit data. No other changes are necessary. Again, the flexibility of the ordered architecture is illustrated.

The conventional character of the architecture and device performance facilitates miniaturization of substantially the complete system by way of integrated circuit technology and the like.

It will be understood by those skilled in the art that the embodiments as set forth hereinbefore are merely exemplary of the various elements and procedures which are essential to the present invention, and as such may be replaced by equivalence without departing from the invention hereof, which now will be defined by the appended claims.

I claim:

1. A circuit for digitally accumulating and storing odometer information, comprising:
   a source of digital signals representing odometer data;
   a binary counter configured from volatile electronic devices and operable to accumulate in successive stages information representing digital odometer data;
   a nonvolatile memory array which stores at individually addressable locations binary words representing decimal odometer data;
   a bus connecting the nonvolatile memory array to the stages of the binary counter;
   means for defining a correspondence between a binary counter stage and a nonvolatile memory array addressable location for purposes of reading or writing data;
   means for relocating a first addressable location assigned to store binary data representing first decimal value odometer data by generating a first new address from first high value decimal odometer data; and
   means for relocating a second addressable location assigned to store binary data representing second decimal value odometer data by generating a second new address from second high value decimal odometer data.

2. The circuit recited in claim 1, further including a means for nonvolatiley writing and reliably sensing flag data at a address in the nonvolatile memory array in response to high decimal value odometer data.

3. The circuit recited in claim 1, further including:
   means for selectively writing the odometer data in a selected counter stage into a corresponding nonvolatile memory array address location; and
   means for selectively reading the odometer data from a selected nonvolatile memory array address location into a corresponding counter stage.

4. The circuit recited in claim 2, further including:
   a means for selectively writing the odometer data in a selected counter stage into a corresponding nonvolatile memory array address location; and
   means for selectively reading the odometer data from a selected nonvolatile memory array address location into a corresponding counter stage.

5. The circuit recited in claim 3, wherein the means for selectively writing the odometer data include:
   means for identifying counter stages subject to a data change between successive write operations; and
   means for selectively writing odometer data for identified stages.

6. The circuit recited in claim 4, wherein the means for selectively writing the odometer data includes:
   means for identifying counter stages subject to a data change between the successive write operations; and
   means for selectively writing odometer data for identified stages.

7. A circuit for digitally accumulating and storing odometer information, comprising:
   a source of digital pulses representing odometer data;
   means for prescaling the relative number of the digital odometer data;
   a BCD counter with at least six decimal stages connected to accumulate prescaled odometer data;
   a nonvolatile memory array for storing four bit BCD odometer data by decimal position at individually addressable locations;
   a four bit wide bus connected to the nonvolatile memory array data input/output connection and to the BCD counter stages;
   control means for defining a correspondence between the counter stages and nonvolatile memory array addresses;
   control means for relocating the address for storing the ones digit data in the nonvolatile memory array upon the indexing of the ten thousands digit data; and
   control means for relocating the address for storing the tens digit data in the nonvolatile memory array upon the indexing or flag of the hundred thousands digit data.

* * * * *